March 8, 1932.  F. W. WILMOT  1,848,284
WHEEL RIM
Filed June 8, 1928
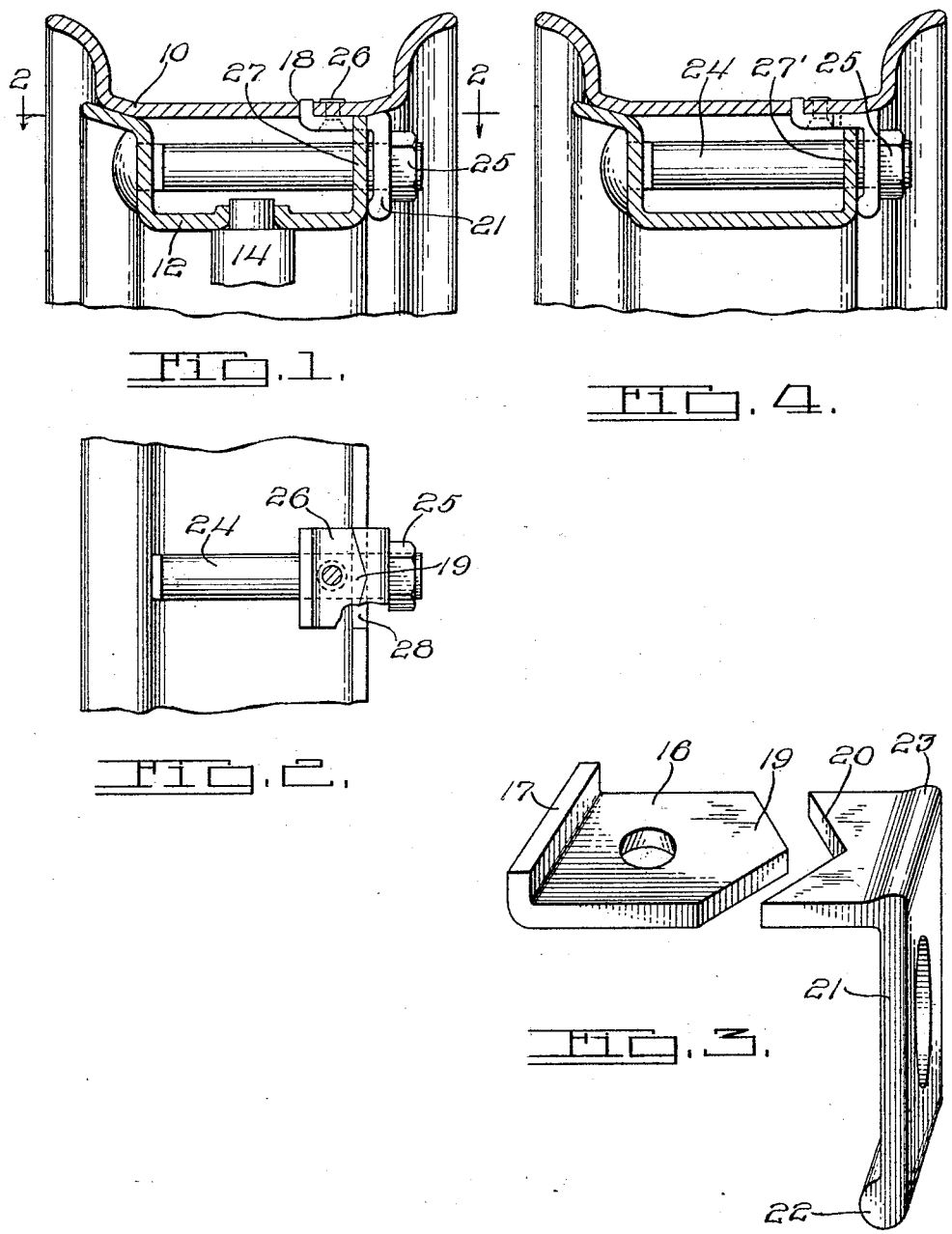
INVENTOR
Fred W. Wilmot
BY
ATTORNEY Patented Mar. 8, 1932

1,848,284

UNITED STATES PATENT OFFICE

FRED W. WILMOT, OF LONG BEACH, CALIFORNIA, ASSIGNOR, BY MESNE ASSIGNMENTS, TO BENDIX BRAKE COMPANY, OF CHICAGO, ILLINOIS, A CORPORATION OF ILLINOIS

WHEEL RIM

Application filed June 8, 1928. Serial No. 283,938.

This invention relates to rims for automotive vehicle wheels and is illustrated as embodied in a rim of the demountable type mounted upon the usual fixed rim or felly of an artillery wheel. An object of the invention is to provide an extremely simple but nevertheless effective so-called anti-creeping device for rims of this class designed to obviate relative movement between the fixed and demountable rims.

A further object of the invention is to provide a novel modification of the conventional demountable rim securing lug, the same being constructed to co-operate with a rim adjunct to obviate rim creeping and at the same time, and substantially unaffected by this function, to perform its normal function of securing the rim in place.

A further feature of the invention relates to the positioning of the anti-creep rim adjunct and rim securing lugs upon the felly in such a manner as to brace the connection between the parts, this to be accomplished by housing the connection within a side wall of the felly.

In the embodiment illustrated, I prefer to fixedly attach one or more suitable clips, each having a wedge-shaped end, to the underside of the demountable rim, the same adapted to interfit with correspondingly shaped female parts each of which may, as illustrated, form the end of the conventional rim securing lug.

The advantages of this arrangement and various additional features of novelty and desirable details of construction, will be apparent from the following description of one illustrative embodiment shown in the accompanying drawings, in which:

Figure 1 is a partial vertical sectional view through a conventional artillery wheel disclosing in elevation my novel anti-creeping structure;

Figure 2 is a view taken on the line 2—2 of Figure 1 indicating the anti-creep and demountable rim lugs in place;

Figure 3 is a detail view in perspective of the cooperating lugs; and

Figure 4 is an arrangement of the parts in a somewhat different type of felly structure.

In the embodiment of my invention disclosed in Figures 1 and 2, 10 denotes a wheel rim of the usual type preferably adapted to be secured to a fixed rim or felly 12 secured to the usual wood spokes 14 of an artillery wheel.

In wheels of this type some means must be provided to prevent creeping of the rim upon the felly for it is obvious that such relative movement has its detrimental effect upon all parts of the wheel particularly the tire valve parts which will obviously be cut by the shearing action of such movement. It is to obviate this effect that the present invention is designed.

As clearly disclosed in Figures 1 and 2, the rim 10 is provided with one or more novel anti-creeping lugs 16 which are preferably of a substantially rectangular shape. Each lug may be provided at one end with an upwardly extending relatively short flange 17 adapted to be housed within a correspondingly shaped slot or opening 18 formed in the wheel rim and may be shaped at its other end to define a protruding wedge or V 19 adapted to fit within a correspondingly shaped recess 20 formed in a conventional rim lug 21. Such a lug is usually of substantially angular section to provide a fulcrum ledge 22 and wedging surface 23 and may be secured to the felly or other peripheral wheel body part by bolts and nuts 24 and 25 respectively passing through said part. My novel anti-creeping lug 16 is preferably secured to the rim by a rivet 26, or its equivalent, passed through suitable openings in the parts.

Of particular importance in the structure briefly described is the relative position of the lugs with respect to the felly in that the meshing wedge parts 19 and 20 are preferably seated upon the ledge defined by the felly flange 27 within the usual recess 28 therein, provided for the flange 23 of the securing lug. Such positioning of the parts obviously braces the connection, obviating any possible relative movement between the anti-creep and rim securing lugs.

My invention is, however, equally adaptable to that type of rim felly and lug combination disclosed in Figure 4, wherein the meshing lug parts may lie within the outline of the felly flange 27' which in this instance is not provided with the lug receiving recessed portions 28 of Figure 1.

In operation, the rim with its attached lug or lugs 16 is positioned upon the felly so that said lug, if a single lug is used, lies opposite one of the rim securing lugs 21 disclosed in Figure 1. Upon tightening of the parts, the lugs in this instance are securely retained in place, first by their fastenings to the rim and felly respectively, and secondly by virtue of their nesting arrangement in recess 28 of the felly structure. Furthermore, the wedge connection of the respective lugs adequately obviates relative movement between the same and thus prevents the undesired creeping of rim with respect to wheel. To a somewhat lesser extent the same purpose is subserved in the construction disclosed in Figure 4 and I wish it to be clearly understood that my novel anti-creeping rim lug and modified rim securing lug may, if desired, be applied to any conventional structure wherever possible.

While one illustrative embodiment of my invention has been described in detail, it is not my intention to limit its scope to that particular embodiment or otherwise than by the terms of the appended claim.

I claim:

A vehicle wheel comprising a channel-sectioned supporting rim provided with an elongated recess in one side wall thereof, a demountable rim seated on said supporting rim and having an elongated rectangular aperture in its central zone, together with a combined anti-creeping and securing means for said demountable rim including a clip in the form of a flat metal part adapted to lie flat against the inner surface of said rim, one end of said clip being upturned to fit into said elongated rectangular aperture, the central part of said clip being adapted to be secured to said rim, and the other end of said clip being formed as a wedge-shaped tongue disposed in a plane normal to a radius of the wheel, and a rim securing lug having one end seated within said elongated recess, said end being formed with a V-shaped notch adapted to interfit with said wedge shaped tongue, the interfitting surfaces between said tongue and lug being so arranged that any creeping of the demountable rim would wedge it axially and more tightly onto the supporting rim.

In testimony whereof I have hereunto signed my name.

FRED W. WILMOT.